United States Patent Office 3,845,213
Patented Oct. 29, 1974

3,845,213
1,2-DIPHENYL-3,5-DIOXOPYRAZOLIDINE COMPOUNDS USED TO TREAT INFLAMMATION
Fritz Eiden, Munich, and Gerhard Gauglitz, Hannover, Germany, assignors to Chem. pharmaz. Fabrik Dr. Hermann Thiemann GmbH
No Drawing. Filed Nov. 20, 1972, Ser. No. 307,889
Int. Cl. A61k 27/00
U.S. Cl. 424—273                4 Claims

ABSTRACT OF THE DISCLOSURE

Covers a pharmaceutical composition comprising 1,2-diphenyl-3,5-dioxo-4-R-4-thiocyanatopyrazolidines of the general formula

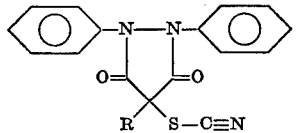

wherein R is a member selected from the group H, $CH_3$, $C_2H_5$, $iso$-$C_3H_7$, $n$-$C_4H_9$ and $C_6H_5$, or 1,2-diphenyl-3,5-dioxo-4-R-pyrazolidino-4-thiocarbamic acid S esters of the general formula

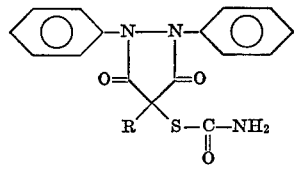

wherein R is a member selected from the group H, $CH_3$, $C_2H_5$, $iso$-$C_3H_7$, $n$-$C_4H_9$ and $C_6H_5$, and use of said composition in treating the symptoms of inflammation.

BACKGROUND OF THE INVENTION

The best known antiphlogistic agent is phenylbutazone, that is 1,2-diphenyl-3,5-dioxo-4-n-butylpyrazolidine of the structural formula

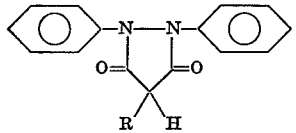

As is known, phenylbutazone can cause certain side effects, e.g. ulcer. Further, its activity is often considered to be insufficient, but its properties have not heretofore been improved by modifications. Therefore, compounds have been sought which exhibit less side effects with as far as possible better or at least equal activity.

It would, therefore, be a significant advance if a better or equally active antiphlogistic agent having less side effects were to be found.

SUMMARY OF THE INVENTION

It, therefore, becomes an object of the invention to provide a pharmaceutical composition useful in treating the symptoms of inflammation in mammalian patients. A specific object of the invention is to provide a method of treating inflammation with a drug exhibiting a low level of side effects.

Essentially this invention is concerned with pharmaceutical compositions useful in treating the symptoms of inflammation in mammalian patients, said compositions comprising an antiphlogistically effective amount of a compound selected from the group consisting of 1,2-diphenyl-3,5-dioxo-4-R-4-thiocyanatopyrazolidines of the general structural formula

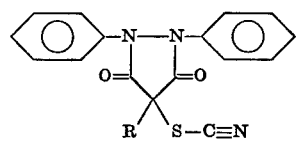

and thiolurethanes of the general structural formula

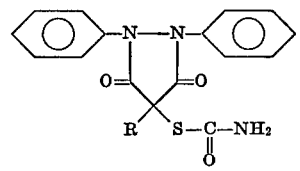

wherein R in each formula is a member selected from the group consisting of H; $CH_3$; $C_2H_5$; $iso$-$C_3H_7$; $n$-$C_4H_9$ and $C_6H_5$, and a pharmaceutical diluent.

DETAILED DESCRIPTION OF THE INVENTION

The dosage unit amount of the antiphlogistically effective compound is preferably 50–200 mg.; preferably 1–3 mg./kg. of body weight is administered in each individual dose and the daily total dosage is 1–12 mg./kg.

The compositions can be administered in the form of solutions, suspensions, tablets, dragees, capsules, suppositories, etc., the content of the active ingredient preferably being 2–5%.

The thiocyano compounds are prepared according to the invention by reacting corresponding diphenylpyrazolidines with ammonium thiocyanate and bromine in glacial acetic acid as shown in the following equation:

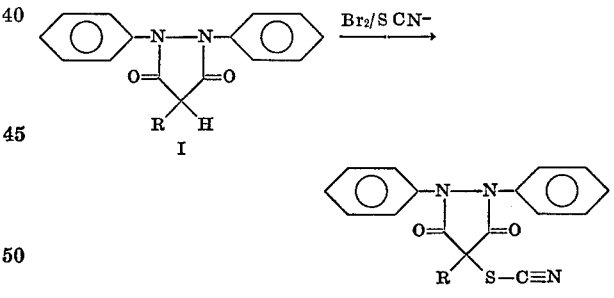

Yields of 90% of theoretical and above are obtained.

Proof of structure can be obtained unambiguously for compounds of Type II with the aid of IR spectra (characteristic bands at 2150/cm.).

The preparation of 4 - thiocyanato-4 - n-butyl-1,2-diphenyl-3,5-dioxopyrazolidine in methanol has been described by V. G. Pesin et al. J. allg. Chem. (Russ.) *28*, 2816 (1958); a melting point of 105–106° C. was quoted for the substance obtained. The actual melting point of the substance is, however, 79–80° C. so that it must be assumed that the starting substance, that is the 1,2-diphenyl-3,5-dioxo-4-n-butylpyrazolidine, was isolated by Russian research workers.

The conversion to the thiolurethanes takes place according to the invention by treatment with strong acids, e.g. 90% sulfuric acid in accordance with the following equation:

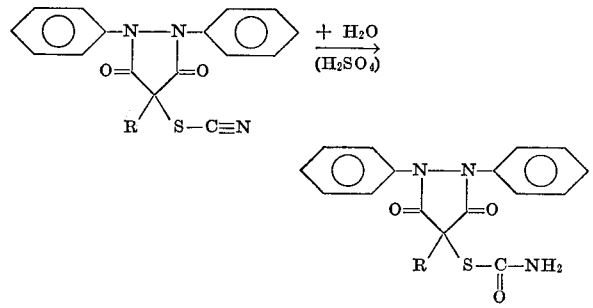

EXAMINATION OF THE ANTIPHLOGISTIC ACTIVITY

The test substance was administered to the animals per os with a stomach tube in dosages of 100 and 500 mg./kg. in 2% and 5% suspensions in propylene glycol. Local inflammation is produced 30 minutes after this administration by injection of 0.1 ml. of dextran solution into one of the rear paws of the test animals (rats).

Paw swelling is measured electronically at a further 30 minutes and 2 hours after that injection by the Kemper and Amelin method and with the aid of an overflow volume measurement by immersing the paws in water.

The values in the following table show the difference in microamperes (Kemper and Amelin method) and the difference in milliliters (volume measurement). The table contains for each case the arithmetic mean value $(\bar{x})$, the simple scatter $(s)$ and the mean value error $(s_{x-})$. It likewise contains the upper limits of the error probabilities $(p)$.

|  | Kemper & Amelin method | | Volume measurement method | |
|---|---|---|---|---|
|  | 30 minutes | 2 hours | 30 minutes | 2 hours |
| Control: |  |  |  |  |
| $\bar{x}$ | 44 | 34 | 1.5 | 1.3 |
| $s$ | 3.2 | 14 | 0.5 | 0.2 |
| $s_x$ | 1.2 | 5.6 | 0.2 | 0.2 |
| 4-thiocyanato-4-n-butyl-1,2-diphenyl-3,5-dioxo-pyrazolidine: |  |  |  |  |
| 100 mg./kg., per os | 32 | 20 | 1.0 | 0.9 |
|  | 13.2 | 11 | 0.5 | 0.25 |
|  | 5.3 | 4.5 | 0.2 | 0.1 |
| $p$ | 0.05 |  |  |  |
| 500 mg./kg., per os | 23 | 19 | 0.5 | 0.5 |
|  | 4.8 | 6.9 | 0.3 | 0.3 |
|  | 2.1 | 2.8 | 0.13 | 0.13 |
| $p$ | 0.0001 | 0.05 |  |  |
| Phenylbutazone: |  |  |  |  |
| 100 mg./kg., per os | 40 | 30 | 0.8 | 0.9 |
|  | 24 | 7.5 | 0.26 | 0.3 |
|  | 9.7 | 3.1 | 0.1 | 0.1 |
| $p$ |  |  |  |  |
| 500 mg./kg., per os | 21 | 20 | 0.5 | 0.5 |
|  | 9.8 | 14 | 0.24 | 0.17 |
|  | 4 | 5.7 | 0.1 | 0.07 |
| $p$ | 0.001 |  |  |  |

EXAMINATION OF THE ULCEROGENIC EFFECT IN RATS

Male Wistar rats weighing 180–220 g. were randomized in groups of 5 animals. The rats were deprived of food for 16 hours prior to the test; water was ad lib.

200 mg./kg. of 4-thiocyanato-4-n-butyl-1,2-diphenyl-3,5-dioxopyrazolidine or, resp., phenylbutazone suspended in water-soluble cellulose ether were administered per os to the test animals. The corresponding amount of water-soluble cellulose ether was administered to the control animals.

Four hours later the rats were sacrificed under ether narcosis, the stomachs removed, rinsed in physiological salt solution and examined.

The result observed was that after treatment with phenylbutazone, a severe hemorrhagic ulceration of the mucosa of the stomach had occurred.

The control animals as well as the two groups treated with 4-thiocyanato - 4 - n - butyl - 1,2 - diphenyl-3,5-dioxopyrazolidine showed no ulceration.

The $LD_{50}$ values of 4-thiocyanato-4-n-butyl-1,2-diphenyl-3,5-dioxopyrazolidine and phenylbutazone were established per oral with male Wistar rats and NMRI mice. The mortalities were determined 24 hours after the single administration. The $LD_{50}$ was calculated using the Finney Probit analysis.

| Compound | Animal | $LD_{50}$ [mg./kg.] |
|---|---|---|
| 4-thiocyanato-4-n-butyl-1,2-diphenyl-3,5-dioxo-pyrazolidine. | Rat | 1,463.6 |
| Phenylbutazone | Rat | 367.4 |
| 4-thiocyanato-4-n-butyl-1,2-diphenyl-3,5-dioxo-pyrazolidine. | Mouse | 1,494.4 |
| Phenylbutazone | do | 276.6 |

Following are detailed examples of preferred embodiments of the invention. They are to be construed as illustrations of the invention and not as limitations thereof.

EXAMPLE I

Preparation of 1,2-diphenyl-3,5-dioxo-4-methyl-4-thiocyanatopyrazolidine 4.84 g. of 1,2-diphenyl-3,5-dioxo-4-methylpyrazolidine were dissolved with 3.8 g. of ammonium thiocyanate in 30 ml. of glacial acetic acid. 6.4 g. of bromine dissolved in glacial acetic acid was added dropwise into the reaction mixture with stirring and cooling over a period of 30 minutes. After a further 5 minutes, the mixture was poured into 200 ml. of water, the resulting precipitate filtered by suction and recrystallized from isopropanol.

Yield: 82% of theoretical; colourless crystals having a m.p. of 120° C.

*Analysis.*—Found: C, 62.77; H, 4.63; N, 13.14; S, 9.67. Calculated: C, 63.14; H, 4.05; N, 13.00; S, 9.92.

EXAMPLE II

Preparation of 1,2-diphenyl-3,5-dioxo-4-ethyl-4-thiocyanatopyrazolidine 12 g. of 1,2-diphenyl-3,5-dioxo-4-ethylpyrazolidine were reacted with ammonium thiocyanate according to the procedure of Example I and the precipitate recrystallized from dilute ethanol.

Yield: 85% of theoretical; colourless crystals having a m.p. of 85° C.

*Analysis.*—Found: C, 64.9; H, 4.50; N, 12.40; S, 9.55. Calculated: C, 64.08; H, 4.48; N, 12.46; S, 9.50.

EXAMPLE III

Preparation of 1,2-diphenyl-3,5-dioxo-4-n-butyl-4-thiocyanatopyrazolidine 5.40 g. of 1,2-diphenyl-3,5-dioxo-4-n-butylpyrazolidine were reacted with ammonium thiocyanate according to the procedure of Example I and the precipitate recrystallized from dilute ethanol.

Yield: 93% of theoretical: colourless crystals having a m.p. of 79° C.

*Analysis.*—Found: C, 65.95; H, 5.34; N, 11.34; S, 8.80. Calculated: C, 65.73; H, 5.24; N, 11.50; S, 8.77.

EXAMPLE IV

Preparation of 1,3-diphenyl-3,5-dioxo-4-n-butyl-pyrazolidino-4-thiocarbamic acid S ester (thiolurethane)

1.0 g. of the compound prepared according to Example III was slowly added to 10 ml. of ice cold 90% sulfuric acid. The solution was kept in a refrigerator for 12 hours and then poured onto ice. The precipitate formed was filtered by suction, washed with water and recrystallized from ethanol.

Yield: 40% of theoretical: colourless crystals having a m.p. of 160° C. (decomposition).

*Analysis.*—Found: C, 62.64; H, 6.14; N, 10.94; S, 8.05. Calculated: C, 62.64; H, 5.52; N, 10.96; S, 8.05.

EXAMPLE V

Tablets having the following composition were prepared:

|  | Mg. |
|---|---|
| 1,2-Diphenyl-3,5-dioxo-4-n-butyl-4-thiocyanatopyrazolidine | 100 |
| Lactose | 40 |
| Corn starch | 20 |
| Talcum | 5 |

Active ingredient and lactose were granulated with isopropanol, the granulate was mixed with the other components and tabletted.

EXAMPLE VI

Dragees were prepared by pressing the mixture of Example V to cores and drageeing the cores in the usual manner.

EXAMPLE VII

Capsules having the following composition were prepared:

|  | Mg. |
|---|---|
| 1,2-Diphenyl-3,5-dioxo-4-n-butyl-4-thiocyanatopyrazolidine | 100 |
| Lactose | 40 |
| d(-(+)-Lactose | 15 |

Active ingredient and lactose were granulated with isopropanol, mixed with the d-(+)-lactose and encapsulated in hard gelatine.

EXAMPLE VIII

Suppositories having the following composition were prepared:

|  | Mg. |
|---|---|
| 1,2-Diphenyl-3,5-dioxo-4-n-butyl-4-thiocyanatopyrazolidine | 100 |
| Suppository composition | 1500 |

The active ingredient having a granular size of 10–50 microns was dispersed in the suppository composition molten at 40° C. and molded into 2 g. suppositories.

EXAMPLE IX

Crystal suspensions having the following composition were prepared:

| | |
|---|---|
| 1,2-Diphenyl-3,5-dioxo-4-n-butyl-4-thiocyanatopyrazolidine mg | 100 |
| Physiological salt solution ml | 2 |

EXAMPLE X

Oily solutions or suspensions having the following composition were prepared:

| | |
|---|---|
| 1,2-Diphenyl-3,5-dioxo-4-n-butyl-4-thiocyanatopyrazolidine mg | 100 |
| Neutral oil, e.g. Miglid 812 ml | 2 |

The active ingredient was finely ground and dissolved or suspended in the quoted liquids by mild heating.

What is claimed is:

1. A pharmaceutical composition in dosage unit form for administration to obtain an antiphlogistic effect comprising an antiphlogistically effective amount of 4-thiocyanato-4-n-butyl-1,2-diphenyl-3,5-dioxopyrazolidine and a pharmaceutical diluent.

2. A pharmaceutical composition in accordance with Claim 1 wherein the amount of antiphlogistically effective compound per dosage unit is from about 50 to 200 mg.

3. A method of treating the symptoms of inflammation in a mammalian patient comprising administering a therapeutically effective amount of a pharmaceutical composition of Claim 1 to a patient in need of that treatment.

4. A method in accordance with Claim 3 wherein said therapeutically effective amount of the antiphlogistically effective compound is 1 to 12 mg./kg. of body weight daily.

References Cited

Chem. Abst. (1) Formula Index, 71–1085f (1969).
Chem. Abst. (2), vol. 72–90407b (1970).

STANLEY J. FRIEDMAN, Primary Examiner